(12) United States Patent
Guo et al.

(10) Patent No.: US 10,135,719 B2
(45) Date of Patent: *Nov. 20, 2018

(54) TRANSMITTING AND RECEIVING DATA BASED ON MULTIPATH

(71) Applicant: INTERNATIONAL BUSINESS MACHINES CORPORATION, Armonk, NY (US)

(72) Inventors: Chang Jie Guo, Beijing (CN); Hongbin Lin, Beijing (CN); Qian Ma, Beijing (CN); Qing Wang, Beijing (CN); Su Su Xie, Beijing (CN); Lin Yang, Beijing (CN); Ji Zheng Zhang, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/288,984

(22) Filed: Oct. 7, 2016

(65) Prior Publication Data
US 2017/0026277 A1  Jan. 26, 2017

Related U.S. Application Data

(63) Continuation of application No. 14/063,116, filed on Oct. 25, 2013, now Pat. No. 9,503,959, which is a (Continued)

(30) Foreign Application Priority Data

Sep. 29, 2012  (CN) .......................... 2012 1 0375932

(51) Int. Cl.
H04W 40/12  (2009.01)
H04L 12/707  (2013.01)
(Continued)

(52) U.S. Cl.
CPC ............ *H04L 45/24* (2013.01); *H04L 45/121* (2013.01); *H04L 47/29* (2013.01); *H04L 47/50* (2013.01);
(Continued)

(58) Field of Classification Search
CPC ...... H04W 40/12; H04W 40/14; H04L 45/24; H04L 45/121
See application file for complete search history.

(56) References Cited

U.S. PATENT DOCUMENTS 8,098,648 B2   1/2012   Nakata et al.
8,107,888 B2   1/2012   Dinan et al.
(Continued)

FOREIGN PATENT DOCUMENTS

CN   101115077   1/2008
CN   101473608   7/2009

OTHER PUBLICATIONS

Zhuang, W., et al. "Multipath Transmission for Wireless Internet Access—From an End-To-End Transport Layer Perspective" Journal of Internet Technology, vol. 13, No. 1. Jan. 2012. pp. 1-18.

*Primary Examiner* — Wei Zhao
(74) *Attorney, Agent, or Firm* — Tutunjian & Bitetto, P.C.; David Quinn

(57) ABSTRACT

Methods, apparatuses and systems for transmitting and receiving data based on multipath for transmitting data based on multipath include: establishing WiMAX connection-based multiple paths between a first device and a second device; transmitting data frames in a data queue in the multiple paths; obtaining the quality condition of the multiple paths; and based on the quality condition, adjusting the transmission of the data frames in the data queue in the multiple paths. According to one aspect, there is provided a method for receiving data based on multipath, which includes: establishing WiMAX connection-based multiple (Continued)

paths between a first device and a second device; receiving a plurality of data frames in the multiple paths; processing the received plurality of data frames based on quality condition of the multiple paths. There are further provided corresponding apparatuses and systems.

12 Claims, 9 Drawing Sheets

Related U.S. Application Data continuation of application No. 14/039,730, filed on Sep. 27, 2013, now Pat. No. 9,420,516.

(51) Int. Cl.
| | | |
|---|---|---|
| *H04W 40/14* | (2009.01) | |
| *H04W 40/08* | (2009.01) | |
| *H04L 12/727* | (2013.01) | |
| *H04L 12/801* | (2013.01) | |
| *H04L 12/863* | (2013.01) | |
| *H04L 29/08* | (2006.01) | |
| *H04W 84/12* | (2009.01) | |

(52) U.S. Cl.
CPC ........... *H04W 40/08* (2013.01); *H04W 40/12* (2013.01); *H04W 40/14* (2013.01); *H04L 69/324* (2013.01); *H04W 84/12* (2013.01); *Y02D 30/20* (2018.01); *Y02D 70/00* (2018.01); *Y02D 70/146* (2018.01); *Y02D 70/324* (2018.01); *Y02D 70/34* (2018.01)

(56) References Cited

U.S. PATENT DOCUMENTS

| | | | |
|---|---|---|---|
| 8,130,699 | B2 | 3/2012 | Stanwood et al. |
| 9,503,959 | B2* | 11/2016 | Guo ...................... H04W 40/12 |
| 2008/0311944 | A1* | 12/2008 | Hansen ..................... G01S 1/02 455/517 |
| 2011/0022812 | A1* | 1/2011 | van der Linden .... G06F 9/5077 711/163 |
| 2012/0182859 | A1* | 7/2012 | Ikeda ..................... H04L 1/1835 370/216 |

* cited by examiner

TRANSMITTING AND RECEIVING DATA BASED ON MULTIPATH

BACKGROUND

Embodiments of the present invention relate to data communication, and more specifically, to methods, apparatuses and systems for transmitting and receiving data based on multipath.

The development of communication technology provides a variety of data communication modes such that an appropriate mode may be selected according to a concrete application environment. Currently Worldwide Interoperability for Microwave Access (WiMAX) becomes a high-speed wireless data network standard. WiMAX may provide various application services, including the last-mile wireless wideband access, hotspots, mobile communication backhaul lines, inter-enterprise high-speed networking for business usage, etc. Due to such advantages as a rapid transmission speed, a long transmission distance and a relatively low cost, WiMAX has been applied to environments like the Internet of Things.

Supervisory Control and Data Acquisition (SCADA) is an important aspect of applications of the Internet of Things. A SCADA system usually comprises a computer control system capable of program supervision and data acquisition, and may be widely applied to data acquisition and supervisory control as well as to process control in fields of power generation, metallurgy, petroleum and chemical engineering. In SCADA, communication may be performed between a monitoring center and site supervisory devices by using WiMAX technology. However, site supervisory devices are usually distributed widely and might be interfered by devices being supervised or other devices. In a wireless communication frequency band used by a SCADA system, WiMAX usually coexists with a traditional narrowband wireless communication system, thereby facing a hostile communication environment. Thus, how to ensure reliable and real-time transmission of data becomes a focus in the WiMAX research world.

SUMMARY

Therefore, it is desired to develop a technical solution capable of supporting WiMAX technology to perform data communication more reliably, and it is desired that the technical solution reduces the modification to hardware devices and software configurations as much as possible while being compatible with an original communication mode; further, it is desired that the technical solution can improve the data transmission efficiency on an accurate and reliable basis. To this end, the embodiments of the present invention provide methods and apparatuses for transmitting and receiving data based on multipath.

According to one aspect of the present invention, there is provided a method for transmitting data based on multipath, comprising: establishing WiMAX connection-based multiple paths between a first device and a second device; transmitting data frames in a data queue in the multiple paths; obtaining quality condition of the multiple paths; and adjusting the transmission of the data frames in the data queue in the multiple paths based on quality condition.

According to one aspect of the present invention, the method is implemented on the top of MAC (Medium Access Control) layer.

According to one aspect of the present invention, there is provided a method for receiving data based on multipath, comprising: establishing WiMAX connection-based multiple paths between a first device and a second device; receiving a plurality of data frames in the multiple paths; processing the received plurality of data frames based on quality condition of the multiple paths.

According to one aspect of the present invention, the method is implemented on the top of MAC layer.

According to one aspect of the present invention, there is provided a method for processing data based on multipath, comprising: establishing WiMAX connection-based multiple paths between a first device and a second device; at the first device, transmitting data frames in a data queue in the multiple paths; obtaining quality condition of the multiple paths; and adjusting the transmission of the data frames in the data queue in each of the multiple paths based on the quality condition; at the second device, receiving the data frames in the multiple paths; and processing the received data frames based on the quality condition of the multiple paths.

According to other aspects of the present invention, there are provided apparatuses and systems for implementing the above methods.

With the methods and apparatuses of the present invention, more reliable and/or efficient data transmission can be ensured without changing existing communication devices as much as possible. Moreover, in various communication environments (e.g., in an environment with different extents of interference), various transmission errors that might occur in existing WiMAX communication may be reduced/eliminated to different extents. In the embodiments of the present invention, at the sender end different policies may be used for sending data frames: for example, using all channels for transferring the same data frames so as to reduce the Bit Error Rate, or allocating data frames to various paths to achieve transmission throughput or optimum in other aspects; at the receiver end, data frames may be received in multiple paths; the received data frames are processed based on a received transmission policy (e.g., received via a control channel).

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
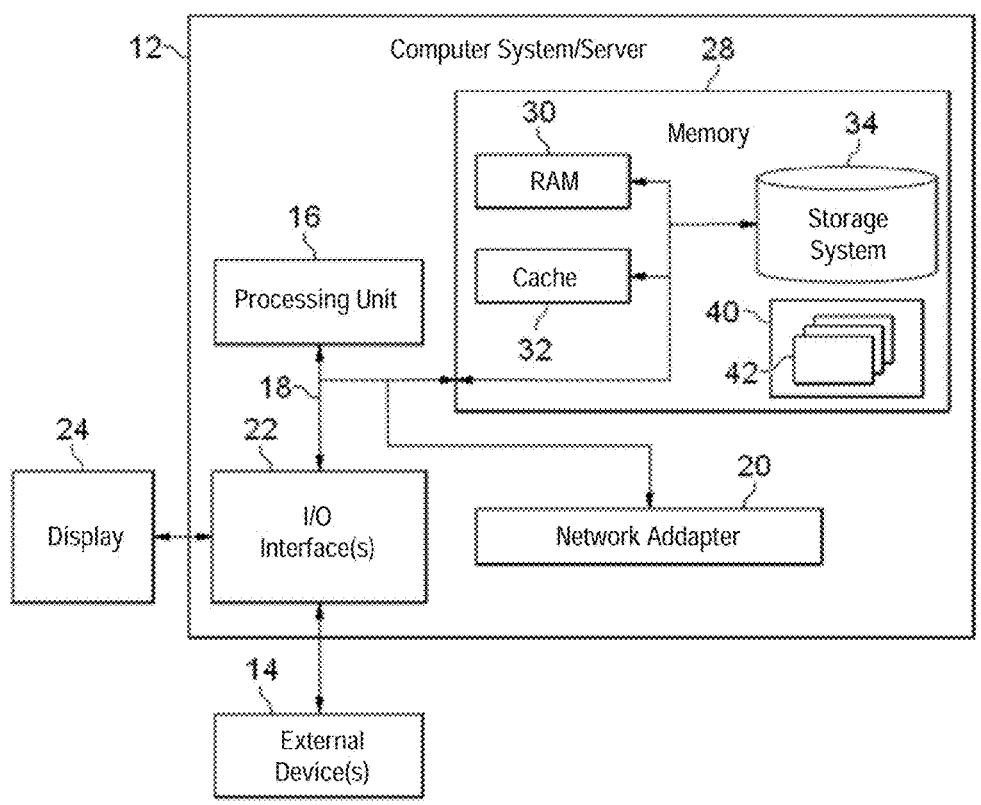
FIG. 1 illustrates an exemplary computer system/server 12 which is applicable to implement the embodiments of the present invention.

Some preferable embodiments will be described in more details with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates an exemplary computer system/server 12 which is applicable to implement the embodiments of the present invention. The computer system/server 12 as illustrated in FIG. 1 is only an example, which should not construct any limitation to the functions and application scope of the embodiments of the present invention.

As illustrated in FIG. 1, the computer system/server 12 is embodied in the form of a general computing device. Components of the computer system/server 12 may comprise, but not limited to, one or more processors or processing units 16, a system memory 28, and a bus 18 connecting different system components (including the system memory 28 and the processing unit 16).

The system bus 18 indicates one or more of a plurality of bus structures, including a memory bus or a memory controller, a peripheral bus, a graphic acceleration port, a processor, or a local bus using any bus structure in the plurality of bus structures. For example, the above hierarchical structures include, but are not limited to, an industrial standard architecture (ISA) bus, a MicroChannel Architecture (MAC) bus, an enhanced-ISA bus, a video electronic standard association (VESA) local bus, and a peripheral component interconnection (PCI) bus.

The computer system/server 12 typically comprises various kinds of computer system-readable mediums. These mediums may be any available mediums accessible by the computer system/server 12, comprising volatile and non-volatile mediums, mobile and non-mobile mediums.

The system memory 28 may comprise a computer system readable medium in a form of volatile memory, for example, a random access memory (RAM) 30 and/or a cache memory 32. The computer system/server 12 may further comprise other mobile/non-mobile, volatile/non-volatile computer system storage mediums. As an example, the memory system 34 may be used to read/write a non-mobile, non-volatile magnetic medium (not illustrated in FIG. 1, generally called "a hard disk driver"). Although not illustrated in FIG. 1, a magnetic disk driver for reading/writing a mobile, non-volatile magnetic disk (for example, a "floppy disk") and an optical disk driver for reading/writing a mobile, non-volatile optical disk (for example, CD-ROM, DVD-ROM, or other optical medium) may be provided. In these cases, each driver may be connected to the bus 18 via one or more data medium interfaces. The memory 28 may comprise at least one program product that has a set of (for example, at least one) program modules, and these program modules may be configured to perform the functions of various embodiments of the present invention.

A program/utility tool 40 comprising a set (at least one) of a program module 42 may be stored in for example the memory 28; such program module 42 comprises, but is not limited to, an operating system, one or more applications, other program modules, and program data, and each of these examples or a certain combination thereof might comprise implementation of a network environment. The program module 42 generally executes the functions and/or methods in the embodiments as described according to the present invention.

The computer system/server 12 may also communicate with one or more peripheral devices 14 (for example, a keypad, a pointing device, a display 24, etc.), and may also communicate with one or more device that enable the user to interact with the computer system/server 12, and/or communicate with any device (for example, network card, modem, etc.) that enables the computer system/server 12 to communicate with one or more other computing devices. Such communication may be performed via an input/output (I/O) interface 22. Moreover, the computer system/server 12 may also communicate with one or more networks (for example, a local area network (LAN), a wide area network (WAN), and/or a public network, for example, Internet). As illustrated in the figure, a network adaptor 20 communicates with other modules of the computer system/server 12 via the bus 18. It should be appreciated that although not illustrated in the figure, other hardware and/or software modules may be used in combination with the computer system/server 12, including, but not limited to, micro-code, device driver, redundancy processing unit, external disk driving array, RAID system, magnetic tape driver, and a data backup storage system, etc.

Figure 2:
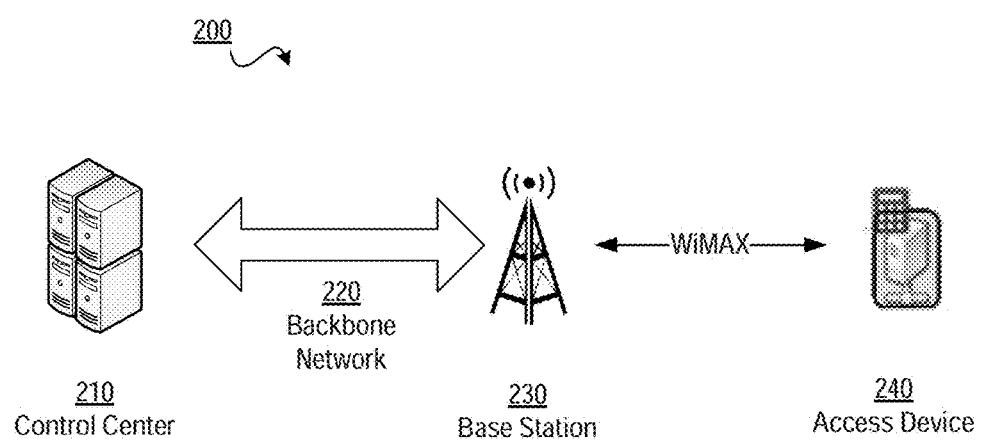
FIG. 2 schematically illustrates a schematic view of a method for transmitting and receiving data according to one solution.

FIG. 2 schematically illustrates a schematic view 200 of a method for transmitting and receiving data according to one solution. In this solution, a control center 210 in a network environment is the core of an entire system. Control center 210 is connected via a backbone network 220 to a base station 230 (the base station 230 may comprise a baseband unit and a remote radio head (RRH)). An access device 240 (e.g., a Remote Terminal Unit (RTU) deployed in monitor site or at other position) communicates with base station 230 through a single WiMAX connection. Although FIG. 2 only illustrates one base station 230 and one access device 240, other base stations and/or access devices may be arranged according to a concrete application environment.

In this solution, to improve the reliability of WiMAX connection, there is proposed a method for supporting multiple communication protocols in the same carrier medium, i.e., running different communication protocols on the WiMAX connection. Although the reliability of data transmission may be improved to some extent by adjusting an adopted communication protocol according to the quality condition of WiMAX, reliable data transmission or even transmission is disabled when the single WiMAX connection is severely interfered or even disconnected.

In view of various defects that are present in the prior art, the present invention provides a technical solution for transmitting and receiving data based on multipath. Note although the embodiments of the present invention are set forth below by taking communication between a base station and an access device as an example, the present invention may be further applied to communication between other devices than base stations and access stations, provided that WiMAX connection-based multiple paths can be established between devices.

In the embodiment of the present invention, the anti-interference capability, reliability and transmission efficiency of data transmission may be improved by establishing multiple paths (e.g., WiMAX connections) between communication devices and adjusting the data transmission in multiple paths based on the quality condition of each path. With reference now to FIG. 3 through FIG. 8A and FIG. 8B, detailed description is presented to the embodiments of the present invention.

Figure 3:
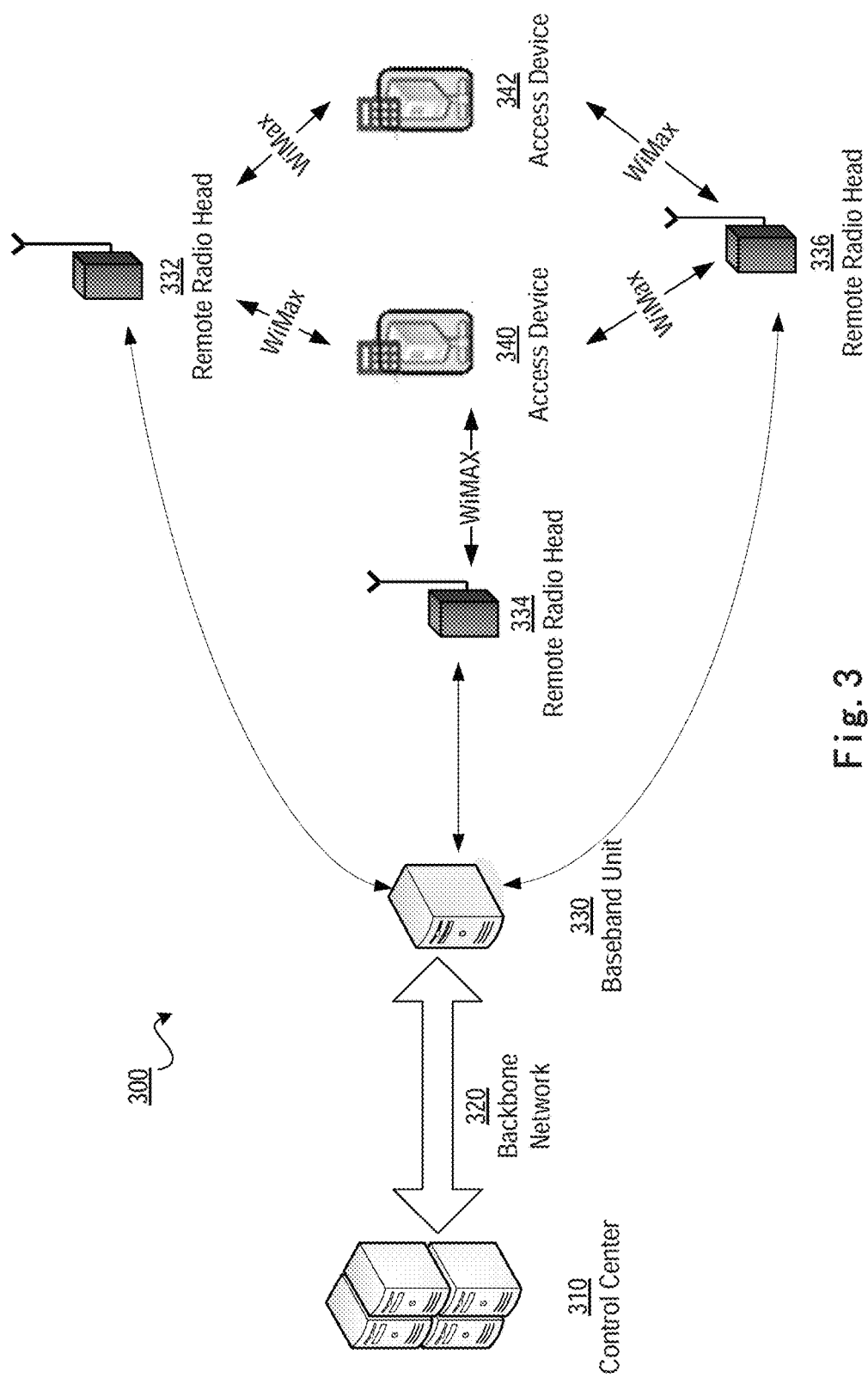
FIG. 3 schematically illustrates an architectural view of a solution for transmitting and receiving data based on multipath according to one embodiment of the present invention.

FIG. 3 schematically illustrates an architectural view 300 of a solution for transmitting and receiving data based on multipath according to one embodiment of the present invention. In a network environment illustrated in FIG. 3, a baseband unit 330 is connected to multiple remote radio heads 332-336. In this embodiment, baseband unit 330 and multiple RRHs 332-336 correspond to base station 230 illustrated in FIG. 2. Here RRHs 332-336 correspond to multiple antennas of the base station, and may be distributed at different geographical positions and thus may enhance the communication capability of the base station. In this embodiment, an access device is configured to establish WiMAX connections with the multiple RRHs (for example, an access 340 establishes three respective WiMAX connections with RRHs 332-336, and an access device 342 establishes two respective WiMAX connections with RRHs 332 and 336). In this manner, it may be ensured that communication may be supported by using the communication capability of other WiMAX when some WiMAX connection/connections gets/get interfered or disconnected.

Note in the embodiment of the present invention although multiple paths have different quality conditions and different transmission capabilities, based on a multipath adaptive transmission policy, all of them may be integrated into a whole, i.e., embodied as a single transmission path to the external. Further, a general-purpose IP layer may be established above the integrated, single transmission path. In other words, the embodiments of the present invention do not change communication protocols for the IP layer and layers above, and may make data transmission below the IP layer more reliable.

In one embodiment of the present invention, there is provided a method for transmitting data based on multipath, comprising: establishing WiMAX connection-based multiple paths between a first device and a second device; transmitting data frames in a data queue in the multiple paths; obtaining quality conditions of the multiple paths; and adjusting the transmission of the data frames in the data queue in the multiple paths based on the quality condition.

Figure 4A:
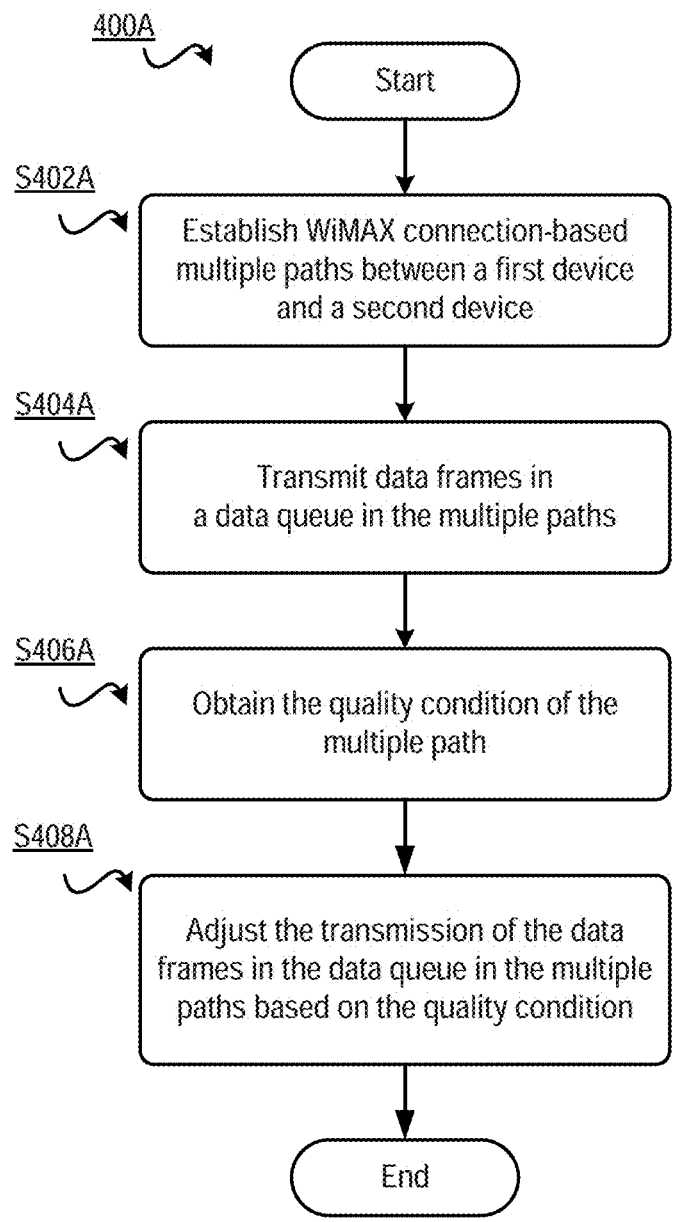
FIGS. 4A and 4B schematically flowcharts methods for transmitting and receiving data based on multipath according to one embodiment of the present invention, respectively.

Refer to FIG. 4A, wherein there is schematically illustrated a flowchart 400A of a method for transmitting data based on multipath according to one embodiment of the present invention. First of all, WiMAX connection-based multiple paths are established between a first device and a second device in step S402A. The multiple paths here may be, for example, the WiMAX connections established between two devices as illustrated in FIG. 3. For example, in one device (e.g., a remote terminal unit deployed in monitor site or at other position) there may be a plurality of independent baseband radiofrequency modules, so that a plurality of WiMAX connections may be simultaneously established with other devices directly or indirectly (for example, multiple paths indirectly exist between baseband unit 330 and access device 340 in FIG. 3).

Note in the embodiment of the present invention, the first device and the second device each may be a single physical device supporting multipath connections or a distributed device deployed at different positions (for example, baseband unit 330 and RRHs 332-336 in FIG. 3 may be regarded as one distributed device). In the context of the present invention, the base station may comprise a baseband unit and remote radio heads associated with the baseband unit.

In step S404A, data frames in a data queue are transmitted in the multiple paths. Data may be transmitted in the multiple paths based on different rules, for example, initially the same or different to-be-transmitted data may be simultaneously transmitted in the multiple paths, or initially test data used for evaluating the quality condition of each path may be transmitted.

In step S406A, the quality condition of the multiple paths is obtained. In this step, the quality condition detected is obtained based on previously transmitted measurement values. The purpose of obtaining the quality condition of the multiple paths is that the data transmission may be adjusted according to the transmission capability of the multiple paths in a subsequent step. Quality data representative of the quality condition of various paths may be transmitted in the multiple paths, so that the quality condition of each path may be learned at the receiver end.

Finally in step S408A, the transmission of the data frames in the data queue in the multiple paths is adjusted based on the quality condition. In this embodiment, "adjust" refers to control what data is transmitted in which path; for example, preferably, data may be transmitted in a path with better quality conditions, less or even no data may be transmitted in a path with worse quality condition, and the same or different data frames may be transmitted in the multiple paths.

In one embodiment of the present invention, the method is implemented on the top of MAC layer. In this embodiment, a control layer is inserted on the top of MAC layer of WiMAX communication, so as to adjust the data transmission in the multiple paths. In this manner, although the multiple paths are established between the first device and the second device, they are only embodied as a single WiMAX connection to the external. In other words, although the data frames in the transmission queue are sent to the receiver end through the multiple paths, at the receiver end, the data frames received via the multiple paths may be processed into a single data stream. Thus, such multiple paths are transparent to the external, and the IP layer and the transmission layer above the MAC layer need no modification. In this embodiment, the control layer inserted on the top of MAC layer serves to adjust the transmission of the data frames according to a predefined adjustment policy.

In one embodiment of the present invention, the quality condition is any one or combination of: Block Error Rate (BLER), Quality of Service (QoS) Indicator and Channel Quality Indicator (CQI). The Block Error Rate may denote the amount ratio of error data blocks to total received data blocks, the greater a value, the worse the transmission quality in a path, otherwise the better the transmission quality. The Quality of Service Indicator comprises bandwidth of transmission, latency of transfer, Packet Loss Rate of data, etc. The Channel Quality Indicator denotes the receive quality of a current channel at the receiver end. In the embodiment of the present invention, any parameter capable of assessing the connection quality of a path may be adopted to denote the quality condition and used as a basis for adjusting the data transmission between the multiple paths.

In one embodiment of the present invention, the adjusting the transmission of the data frames in the data queue in the multiple paths based on the quality condition comprises: in response to the quality condition of each of the multiple paths satisfying a first threshold range, transmitting the same data frames in the data queue in each of the multiple paths, wherein the first threshold range is a range of values associated with the quality condition. In one embodiment of the present invention, the adjusting the transmission of the data frames in the data queue in the multiple paths based on the quality condition comprises: in response that the quality condition of at least one of the multiple paths satisfies a second threshold range, balancing the transmission traffic in each of the multiple paths, wherein the second threshold range is a range of values associated with the quality condition.

When the quality condition of paths is described using different parameters, different boundary conditions may be defined. Generally speaking, branch conditions may be defined such that when the quality condition of each path is bad, the same data frames in the data queue are transmitted in each of the multiple paths; when the quality condition of at least one of the multiple paths is good, the transmission traffic in each of the multiple paths may be balanced (for example, data is preferentially transmitted in a path with good quality condition).

For example, when the quality condition is denoted by the Block Error Rate, it may be defined that when the Block Error Rate of each of the multiple paths is greater than or equal to a predetermined threshold (e.g., 10-100%) (i.e., the quality condition satisfies the first threshold range), the same data frames in the data queue are transmitted in each of the multiple paths. In this embodiment, "10%" is merely a specific example of predetermined thresholds, and those skilled in the art may define other values according to concrete situation. This embodiment indicates when the transmission quality of each path is bad, the same data frames may be transmitted in each path. At this point, although the transmission quality of each path is bad, at the receiver end correct data frames may be selected from the data frames transmitted via the multiple paths, and other incorrect data frames are discarded, so that the reliability of data transmission may be improved to a certain extent.

For another example, when the quality condition is denoted by the Block Error Rate, it may be defined that when the Block Error Rate of at least one of the multiple paths is less than a predetermined threshold (e.g., 0-10%) (i.e., the quality condition satisfies the second threshold range), the transmission traffic in each of the multiple paths is balanced. This embodiment indicates since among the multiple paths there is at least one path with good transmission quality, data transmission may be allocated to a path with good quality according to the transmission quality. Based on different purposes, data transmission may be allocated among the multiple paths in other manners.

In one embodiment of the present invention, the first threshold range and the second threshold range may be defined with respect to the Quality of Service Indicator and the Channel Quality Indicator.

In one embodiment of the present invention, the first threshold range and the second threshold range may be adjusted dynamically, for example, the above predetermined thresholds may be changed to 12% etc., so as to formulate rules that better conform to the quality condition of each path.

In one embodiment of the present invention, the balancing the transmission traffic in each of the multiple paths comprises: predicting a predicted completion time that is spent in transmitting one data frame in each of the multiple paths; and transmitting the data frame in a path corresponding to the shortest predicted completion time. For example, when the purpose is to maximize the transmission efficiency, a time that is spent in transmitting to-be-transmitted data frames in each path is predicted according to historical experience, and a path that transmits the maximum data amount in each unit time may be selected; a path with the shortest predicted completion time may be selected for a specific data frame.

In one embodiment of the present invention, the balancing the transmission traffic in each of the multiple paths comprises: predicting power consumption for transmitting one data frame in each of the multiple paths; and transmitting the data frames in a path corresponding to the minimum power consumption. When the purpose is to minimize the power consumption, energy used for transmitting to-be-transmitted data frames in each path may be predicted according to historical experience, and a path that transmits the maximum data amount in each unit power may be selected; a path with the minimum power consumption may be selected for a specific data frame.

In one embodiment of the present invention, the first device and the second device are a base station and an access device, respectively. The method for transmitting data described above with reference to FIG. 4A does not specially limit whether the data transmitted is downlink data or uplink data. When data frames are transmitted from the base station to the access device by using the above method, the transmission process may be called downlink data transmission; when data frames are transmitted from the access device to the base station by using the above method, the transmission process may be called uplink data transmission. Note in embodiments of the present invention, the first device and the second device may be other devices that are capable of directly or indirectly communicating with a base station and an access device.

In one embodiment of the present invention, there is provided a method for receiving data based on multipath, comprising: establishing WiMAX connection-based multiple paths between a first device and a second device; receiving a plurality of data frames in the multiple paths; processing the received plurality of data frames based on quality condition of the multiple paths.

Figure 4B:
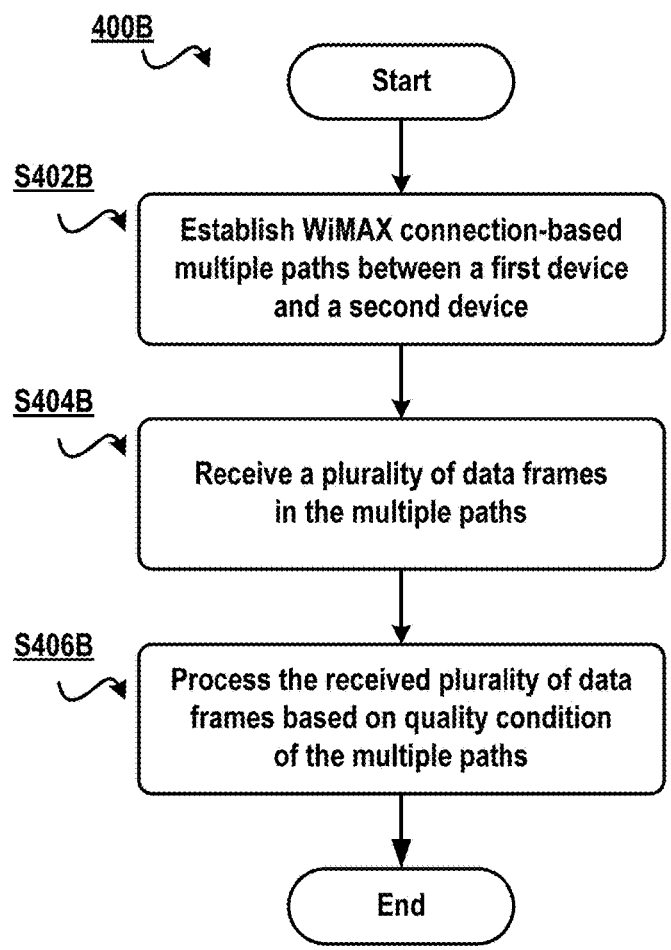

FIG. 4B schematically illustrates a flowchart 400B of a method for receiving data based on multipath according to one embodiment of the present invention. The receiving method illustrated in FIG. 4B is a method corresponding to the transmitting method illustrated in FIG. 4A, so description of the same content involved in the two methods will be omitted below.

First of all, in step S402B, WiMAX multiple paths are established between a first device and a second device; in step S404B, a plurality of data frames are received in the multiple paths. The received plurality of data frames might be data frames of the same data, or may be data frames of different data, at which point the data frames need to be processed based on the quality condition of the multiple paths. In step S406B, the received plurality of data frames are processed based on the quality condition of the multiple paths. Here "process" means "restoring" data that is received in the multiple paths according to a policy corresponding to that used in transmission.

In one embodiment of the present invention, a transmission policy that is used in sending by the sender end may be transmitted in a control channel, and at the receiver end the received data frames may be processed using the transmission policy transmitted via the control channel. Here the transmission policy is associated with the quality condition of the multiple paths. For example, when the quality condition of each of the multiple paths satisfies the first threshold range, one transmission policy is used; when the quality condition of at least one of the multiple paths satisfies the second threshold range, another transmission policy is used.

Figure 5:
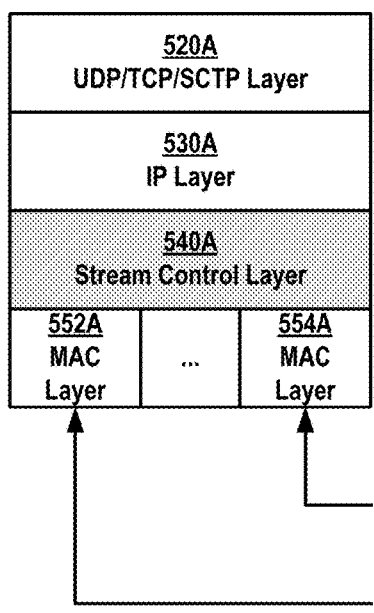
FIG. 5 schematically illustrates a communication protocol model according to one embodiment of the present invention.
Figure 5:
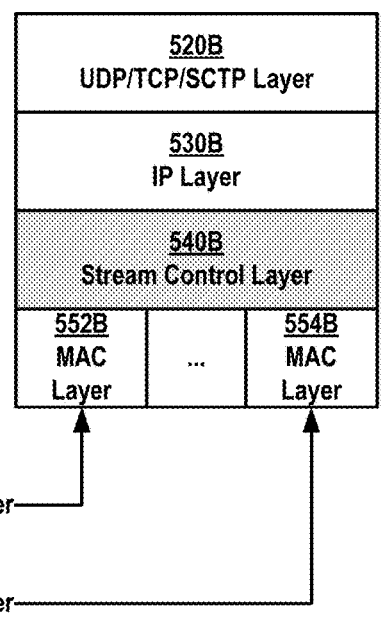

In one embodiment of the present invention, the method is implemented on the top of MAC layer. Like the transmission method illustrated in FIG. 4A, the receiving method may also be implemented on the top of MAC layer of WiMAX connections. With reference now to FIG. 5, detailed description is presented to how to implement the methods for transmitting and receiving according to the present invention.

FIG. 5 schematically illustrates a communication protocol model according to one embodiment of the present invention. In FIG. 5 there are illustrated respective schematic views of layers in a base station 510A and an access device 510B. At the base station end and at the access device end in FIG. 5, there are illustrated from the bottom up: a physical layer; and MAC layers 552A-554A, 552B-554B; stream control layers 540A, 540B; IP layers 530A, 530B; and UDP/TCP/SCTP layers 520A, 520B. Note according to the embodiment of the present invention, stream control layer 540A is inserted between IP layer 530A and MAC layers 552A-554A in base station 510A, and stream control layer 540B is inserted between IP layer 530B and MAC layers 552B-554B in access device 510B. In this manner, it may be ensured that data transmission below the IP layer is more reliable.

In one embodiment of the present invention, the processing the received plurality of data frames based on the quality condition of the multiple paths comprises: for the plurality of data frames, in response to the quality condition of each of the multiple paths satisfying a first threshold range, selecting a correct data frame in each path, wherein the first threshold range is a range of values associated with the quality condition. In one embodiment of the present invention, the processing the received plurality of data frames based on the quality condition of the multiple paths comprises: for the plurality of data frames, in response to the quality condition of at least one of the multiple paths satisfying a second threshold range, connecting the plurality of data frames according to serial numbers or timestamps of the plurality of data frames, wherein the second threshold range is a range of values associated with the quality condition.

Here the first threshold range and the second threshold range are identical to the first threshold range and the second threshold range in the transmitting method. Continuing the above example, when the quality condition satisfies the first threshold range, this means the transmission quality of each path is bad, so the same data frames are transmitted in each path during the transmission process. Accordingly, during the receiving process, simply correct (e.g., implemented based on check code) data frames are selected from the data frames received via the multiple paths.

When the quality condition satisfies the second threshold range, this means there is at least one path with good transmission quality among the multiple paths, at which point data fames with different content are transmitted in the multiple paths. Thus, while receiving, the plurality of data frames may be connected according to frame serial numbers or timestamps in the plurality of data frames. Those skilled in the art may first place the received plurality of data frames in a buffer, and then decide, according to the quality condition and frame serial numbers or timestamps in the data frames, which data frame(s) to be discarded and how to assemble each data frame.

In one embodiment of the present invention, the quality condition is any one or combination of: Block Error Rate, Quality of Service Indicator and Channel Quality Indicator. In one embodiment of the present invention, the first device and the second device are a base station and an access device, respectively.

Figure 6:
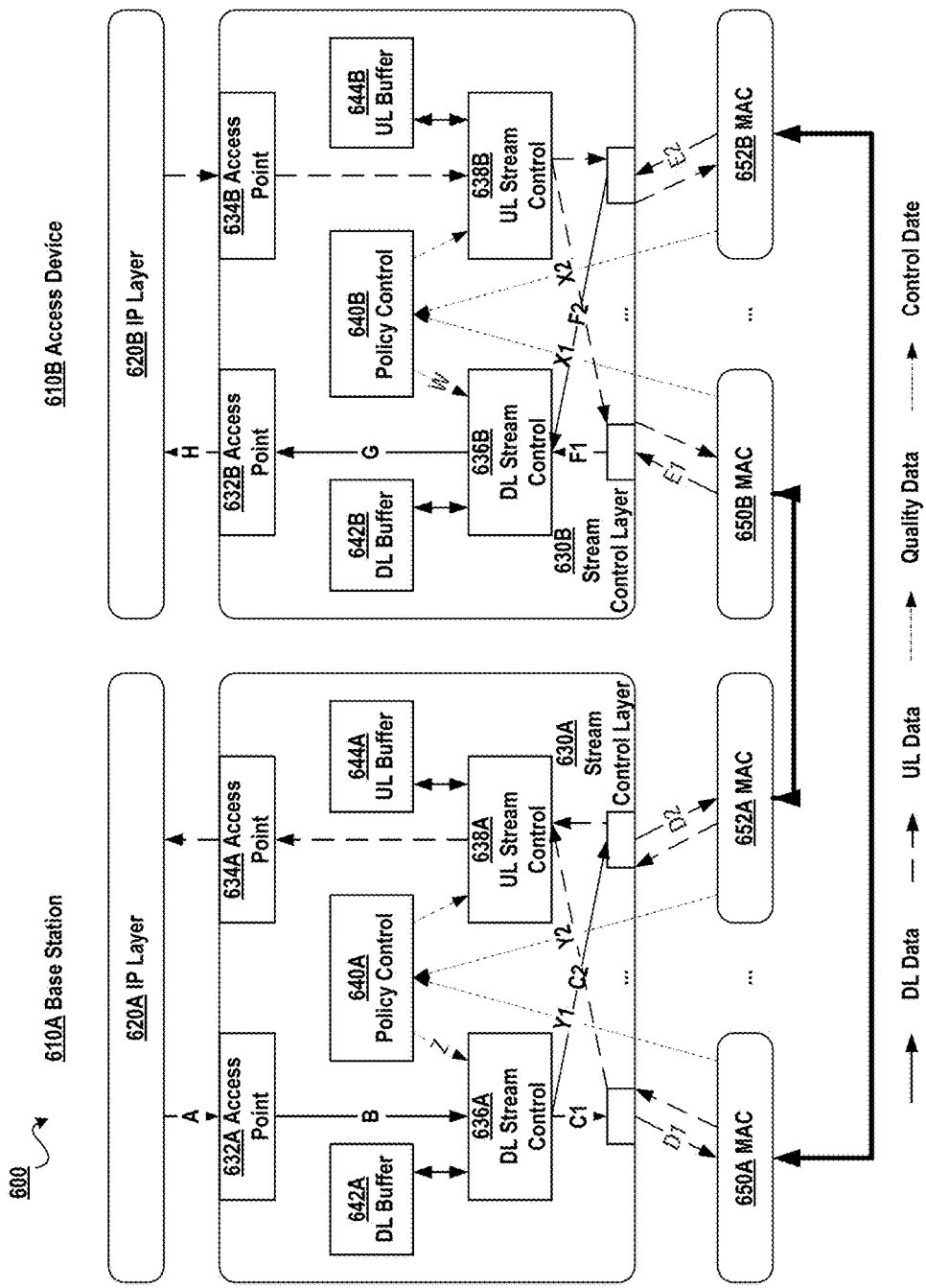
FIG. 6 illustrates a schematic view of transmitting and receiving data based on multipath according to one embodiment of the present invention.

FIG. 6 illustrates a schematic view 600 of transmitting and receiving data based on multipath according to one embodiment of the present invention. In the left of FIG. 6, there is illustrated a schematic view of data streams at the base station 610A side, and in the right there is illustrated a schematic view of data streams at an access device 610B side. In FIG. 6, different legends are used to illustrate respective flow directions of downlink (DL) data, uplink (UL) data, quality data and control data.

Illustration is now presented in conjunction with the flow direction of DL data. First of all, DL data goes from an IP layer 620A at the base station 610A side via an access point 632A into a stream control layer 630A (as illustrated by arrow A); here, a DL buffer 642A is used for buffering data in a to-be-sent queue, and DL may be delivered between a DL stream control 636A and DL buffer 642A. Subsequently, under the control of DL stream control 636A, DL data goes into a MAC layer 650A and a MAC layer 652A as illustrated by arrow C1-D1 and arrow C2-D2, respectively, and is transmitted via a physical layer to a MAC layer 650B and a MAC layer 652B at the access device 610B side, respectively. Then, DL data goes into a DL stream control 636B in a stream control layer 630B as illustrated by arrow E1-F1 and arrow E2-F2, respectively. A DL buffer 642B is used for buffering DL data received via multiple paths, and DL data may be communicated between DL stream control 636B and DL buffer 642B. Next, DL data is transmitted from DL stream control 636B to an access point 632B (as illustrated by arrow G) and then goes into an IP layer 620B at the access device 610B side in a direction as illustrated by arrow H.

At the base station 610A side, a policy control 640A may obtain quality data of each path from MAC layers 650A and 652A (as illustrated by arrows Y1 and Y2), and policy control 640A may send control data indicating how to transmit data over multiple paths, to DL stream control 636A based on quality data (as illustrated by arrow Z). On the access device 610B side, similarly, a policy control 640B may obtain quality data of paths from MAC layers 650B and 652B (as illustrated by arrows X1 and X2), and policy control 640B may send control data indicating how to combine data from multiple paths, to DL stream control 636B based on quality data (as illustrated by arrow W).

The process of transmitting downlink data from a base station to an access device has been illustrated by way of example only. As a transmission direction of uplink data is opposite to that of downlink data, those skilled in the art may understand details related to uplink data transmission according to directions illustrated by dotted arrows. Moreover, quality data and control data which are used in uplink data transmission are similar to those used in downlink data transmission, and thus are not detailed here. Note uplink data may be data (e.g., images or video, etc.) monitored on the site, and downlink data may be control commands sent from a control center, etc. In different application environments, uplink data/downlink data may carry different information.

Figure 7A:
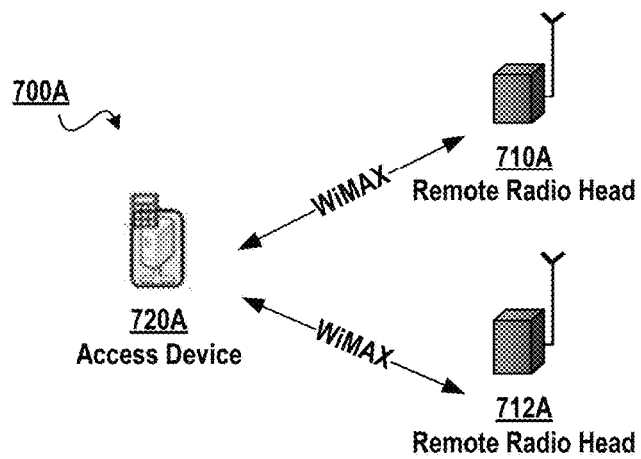
FIGS. 7A-7C illustrate schematic views of using a method according to the embodiments of the present invention in different interference conditions.
Figure 7B:
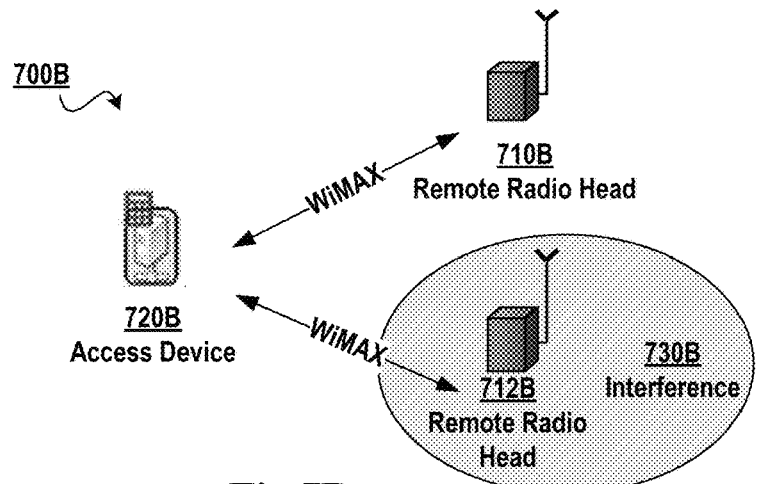
Figure 7C:
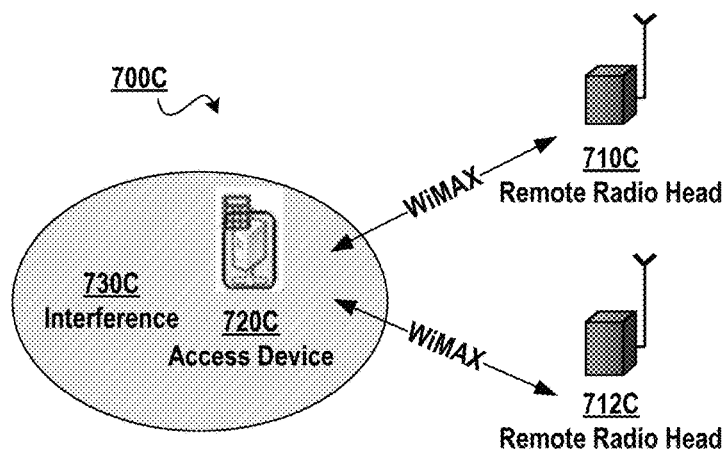

FIGS. 7A-7C illustrate schematic views 700A-700C of using a method according to the embodiments of the present invention with different extents of interference. Specifically, in FIG. 7A an access device 720A is connected to remote radio heads 710A and 712A by two WiMAX connections, respectively. At this point, the two WiMAX connections are both in good quality condition, so data transmission in the two WiMAX connections may be balanced based on the above purpose of maximizing transmission efficiency or minimizing energy consumption, for example.

In FIG. 7B, an access device 720B is connected to remote radio heads 710B and 712B by two WiMAX connections. At this point, remote radio head 712B is within an interference range 730B. As a result, a WiMAX connection between access device 720B and remote radio head 712B is in bad quality condition or even disconnected, at which point data may be transmitted mainly via a WiMAX between access device 720B and remote radio head 710B.

In FIG. 7C, an access device 720C is connected to remote radio heads 710C and 712C by two WiMAX connections. At this point, access device 720C is within an interference range 730C, so both of the two WiMAX connections are in poor quality condition. In order to achieve more reliable data transmission, the same data frames may be transmitted in the two WiMAX connections, and correct data frames may be selected at the receiver end.

As seen from the examples in three scenarios illustrated in FIGS. 7A-7C, by establishing multiple paths (for example, WiMAX connections) between communication devices, methods according to embodiments of the present invention may provide more reliable, high-efficiency data transmission where there are different extents of interference.

Figure 8A:
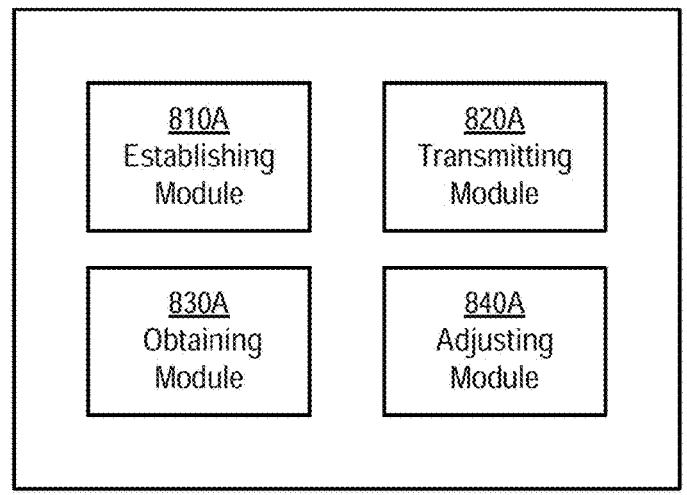
FIGS. 8A and 8B illustrate schematic views for transmitting and receiving data based on multipath according to one embodiment of the present invention, respectively.
Figure 8B:
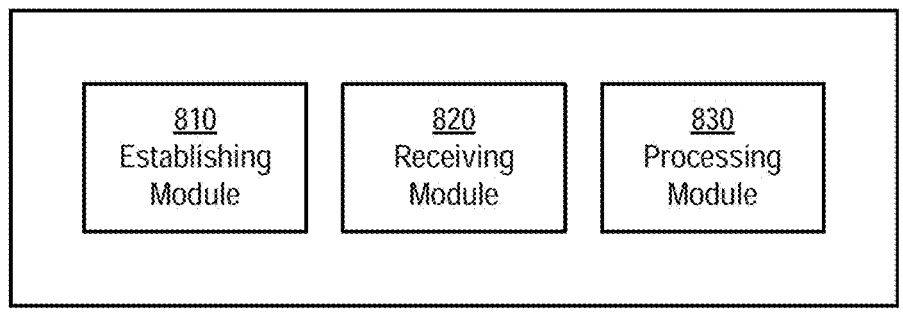

FIGS. 8A and 8B illustrate schematic views 800A and 800B of apparatuses for transmitting and receiving data based on multipath according to one embodiment of the present invention, respectively. As illustrated in FIG. 8A, there is provided an apparatus for transmitting data based on multipath, comprising: an establishing module 810A configured to establish WiMAX connection-based multiple paths between a first device and a second device; a transmitting module 820A configured to transmit data frames in a data queue in the multiple paths; an obtaining module 830A configured to obtain quality condition of the multiple paths; and an adjusting module 840A configured to adjust the transmission of the data frames in the data queue in the multiple paths based on the quality condition.

In one embodiment of the present invention, the apparatus is implemented on the MAC layer.

In one embodiment of the present invention, adjusting module 840A comprises: a data transmitting module configured to, in response to the quality condition of each of the multiple paths satisfying a first threshold range, transmit same data frames in the data queue in each of the multiple paths, wherein the first threshold range is a range of values associated with the quality condition.

In one embodiment of the present invention, adjusting module 840A further comprises: a balancing module configured to, in response to the quality condition of at least one of the multiple paths satisfying a second threshold range, balance the transmission traffic in each of the multiple paths, wherein the second threshold range is a range of values associated with the quality condition.

In one embodiment of the present invention, the balancing module comprises: a first predicting module configured to predict a predicted completion time that is spent in transmitting one data frame in each of the multiple paths; and a first transmitting module configured to transmit the data frames in a path corresponding to the shortest predicted completion time.

In one embodiment of the present invention, the balancing module 840A comprises: a second predicting module configured to predict power consumption for transmitting one data frame in each of the multiple paths; and a second transmitting module configured to transmit the data frame in a path corresponding to the minimum power consumption.

In one embodiment of the present invention, the quality condition is any one or combination of: Block Error Rate, Quality of Service Indicator and Channel Quality Indicator.

In one embodiment of the present invention, the first device and the second device are a base station and an access device, respectively.

In one embodiment of the present invention, there is provided an apparatus for receiving data based on multipath. As illustrated in FIG. 8A, the apparatus comprises: an establishing module 810B configured to establish WiMAX connection-based multiple paths between a first device and a second device; a receiving module 820B configured to receive a plurality of data frames in the multiple paths; and a processing module 830B configured to process the received plurality of data frames based on quality conditions of the multiple paths.

In one embodiment of the present invention, the apparatus is implemented on the MAC layer.

In one embodiment of the present invention, processing module 830B comprises: a selecting module configured to, for the plurality of data frames, in response to the quality condition of each of the multiple paths satisfying a first threshold range, select correct data frames from the multiple paths, wherein the first threshold range is a range of values associated with the quality condition.

In one embodiment of the present invention, processing module 830B comprises: a connection module configured to, for the plurality of data frames, in response to the quality condition of at least one of the multiple paths satisfying a second threshold range, connect the plurality of data frames according to frame serial numbers or timestamps in the plurality of data frames, wherein the second threshold range is a range of values associated with the quality condition.

In one embodiment of the present invention, the quality condition is any one or combination of: Block Error Rate, Quality of Service Indicator and Channel Quality Indicator.

In one embodiment of the present invention, the first device and the second device are a base station and an access device, respectively.

In one embodiment of the present invention, there is provided a method for processing data based on multipath, comprising: establishing WiMAX connection-based multiple paths between a first device and a second device; at the first device, transmitting data frames in a data queue in the multiple paths; obtaining the quality condition of the multiple paths; and adjusting the transmission of the data frames in the data queue in each of the multiple paths based on the quality condition; at the second device, receiving the data frames in the multiple paths; and processing the received data frames based on the quality condition of the multiple paths.

In one embodiment of the present invention, there is provided a system for processing data based on multipath, comprising: an establishing module 810A configured to establish WiMAX connection-based multiple paths between a first device and a second device; a transmitting module 820A configured to transmit data frames in a data queue in the multiple paths; an obtaining module 830A configured to obtain the quality condition of the multiple paths; and an adjusting module 840A configured to adjust the transmission of the data frames in the data queue in each of the multiple paths based on the quality condition; an establishing module 810B configured to establish WiMAX connection-based multiple paths between a first device and a second device; a receiving module 820B configured to receive a plurality of data frames in the multiple paths; and a processing module configured to process the received plurality of data frames based on the quality condition of the multiple paths.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus for transmitting data based on multipath, comprising:
   an establishing module configured to establish Worldwide Interoperability for Microwave Access (WiMAX) connection-based multiple paths between a first device and a second device;
   a transmitting module configured to transmit data frames in a data queue in the multiple paths;
   an obtaining module configured to obtain a quality condition of the multiple paths;
   an adjusting module configured to adjust, using a hardware processor, the transmission of the data frames in the data queue across the multiple paths based on the quality condition; and
   a balancing module configured to balance the transmission traffic in each of the multiple paths in response to the quality condition of at least one of the multiple paths satisfying a second threshold range, the second threshold range being a range of values associated with the quality condition.

2. The apparatus according to claim 1, wherein the apparatus is implemented on a Medium Access Control (MAC) layer.

3. The apparatus according to claim 1, wherein the adjusting module comprises:
   a data transmitting module configured to, in response to the quality condition of each of the multiple paths satisfying a first threshold range, transmit same data frames in the data queue in each of the multiple paths;
   wherein the first threshold range is a range of values associated with the quality condition.

4. The apparatus according to claim 1, wherein the balancing module comprises:
   a first predicting module configured to predict a predicted completion time that is spent in transmitting one data frame in each of the multiple paths; and
   a first transmitting module configured to transmit the data frames in a path corresponding to a shortest predicted completion time.

5. The apparatus according to claim 1, wherein the balancing module comprises:
   a second predicting module configured to predict power consumption for transmitting one data frame in each of the multiple paths; and
   a second transmitting module configured to transmit the data frames in a path corresponding to a minimum power consumption.

6. The apparatus according to claim 1, wherein the quality condition is any one or combination of: Block Error Rate, Quality of Service Indicator and Channel Quality Indicator.

7. The apparatus according to claim 1, wherein the first device and the second device are a base station and an access device, respectively.

8. An apparatus for receiving data based on multipath, comprising:
   an establishing module configured to establish Worldwide Interoperability for Microwave Access (WiMAX) connection-based multiple paths between a first device and a second device;
   a receiving module configured to receive a plurality of data frames from across the multiple paths;
   a processing module configured to process, using a hardware processor, the plurality of data frames received from across the multiple paths based on a quality condition of the multiple paths; and
   a connection module configured to connect the plurality of data frames according to frame serial numbers or timestamps in the plurality of data frames in response to the quality condition of at least one of the multiple paths satisfying a second threshold range, the second threshold range being a range of values associated with the quality condition.

9. The apparatus according to claim 8, wherein the apparatus is implemented on a Medium Access Control (MAC) layer.

10. The apparatus according to claim 8, wherein the processing module comprises:
    a selecting module configured to, for the plurality of data frames, in response to the quality condition of each of the multiple paths satisfying a first threshold range, select correct data frames from the plurality of data frames,
    wherein the first threshold range is a range of values associated with the quality condition.

11. The apparatus according to claim 8, wherein the quality condition is any one or combination of: Block Error Rate, Quality of Service Indicator and Channel Quality Indicator.

12. The apparatus according to claim 8, wherein the first device and the second device are a base station and an access device, respectively.

* * * * *